United States Patent
Murakami et al.

(10) Patent No.: US 11,873,859 B2
(45) Date of Patent: Jan. 16, 2024

(54) CLAMPER MECHANISM FOR MOTION GUIDE DEVICE

(71) Applicant: THK CO., LTD., Tokyo (JP)

(72) Inventors: Yoshinori Murakami, Tokyo (JP);
Reiji Abe, Tokyo (JP); Tadashi Matsuhira, Tokyo (JP); Yoshiro Oishi, Tokyo (JP); Hiroaki Mochizuki, Tokyo (JP); Hajime Fukushima, Tokyo (JP); Hiroomi Kuribayashi, Tokyo (JP); Akito Kaneko, Tokyo (JP)

(73) Assignee: THK CO., LTD., Tokyo (JP)

( * ) Notice: Subject to any disclaimer, the term of this patent is extended or adjusted under 35 U.S.C. 154(b) by 74 days.

(21) Appl. No.: 17/608,783

(22) PCT Filed: Apr. 28, 2020

(86) PCT No.: PCT/JP2020/018084
§ 371 (c)(1),
(2) Date: Nov. 4, 2021

(87) PCT Pub. No.: WO2020/226098
PCT Pub. Date: Nov. 12, 2020

(65) Prior Publication Data
US 2022/0299065 A1    Sep. 22, 2022

(30) Foreign Application Priority Data
May 8, 2019    (JP) .................. 2019-088443

(51) Int. Cl.
*F16C 29/10*    (2006.01)
*F16C 29/06*    (2006.01)

(52) U.S. Cl.
CPC .............. *F16C 29/10* (2013.01); *F16C 29/06* (2013.01)

(58) Field of Classification Search
CPC ...................................................... F16C 29/10
See application file for complete search history.

(56) References Cited

U.S. PATENT DOCUMENTS 5,785,155 A * 7/1998 Geka ................ F16C 29/10
188/41
8,616,343 B2 * 12/2013 Wako ................ F16C 29/04
188/67

(Continued)

FOREIGN PATENT DOCUMENTS

JP    2015-48911 A    3/2015
JP    2018-31401 A    3/2018

(Continued)

OTHER PUBLICATIONS

Office Action dated Jan. 17, 2023, issued in counterpart JP Application No. 2019-088443, with English Translation. (8 pages).

(Continued)

*Primary Examiner* — James Pilkington
(74) *Attorney, Agent, or Firm* — WHDA, LLP

(57) ABSTRACT

A clamper mechanism for a motion guide device includes a clamper block having tapered faces, clamper rolling elements arranged between the tapered faces and both left and right side faces of a track member, and a clamper rolling element holder attached to the clamper block with an interposition of an elastic member. When an elastic force exerted by the elastic member acts in a direction in which the clamper block and the clamper rolling element holder are separated from each other, the clamper rolling elements bite the tapered faces to bring the clamper block into a state restrained to the track member. When an external force against the elastic force exerted by the elastic member acts, the clamper rolling elements are brought into a free state within the tapered faces to bring the clamper block into a (Continued)

ENLARGED VIEW OF SECTION A-A state not restrained to the track member to exert a stable clamping force.

8 Claims, 15 Drawing Sheets

(56) References Cited

U.S. PATENT DOCUMENTS

| | | |
|---|---|---|
| 11,199,207 B2 * | 12/2021 | Mochizuki .............. F16C 29/10 |
| 2013/0028546 A1 | 1/2013 | Wako et al. |
| 2021/0131465 A1 | 5/2021 | Mochizuki et al. |

FOREIGN PATENT DOCUMENTS

| | | |
|---|---|---|
| JP | 2018-151066 A | 9/2018 |
| WO | 2011/081209 A1 | 7/2011 |

OTHER PUBLICATIONS

International Search Report dated Aug. 4, 2020, issued in counterpart International Application No. PCT/JP2020/018084 (2 pages).

* cited by examiner

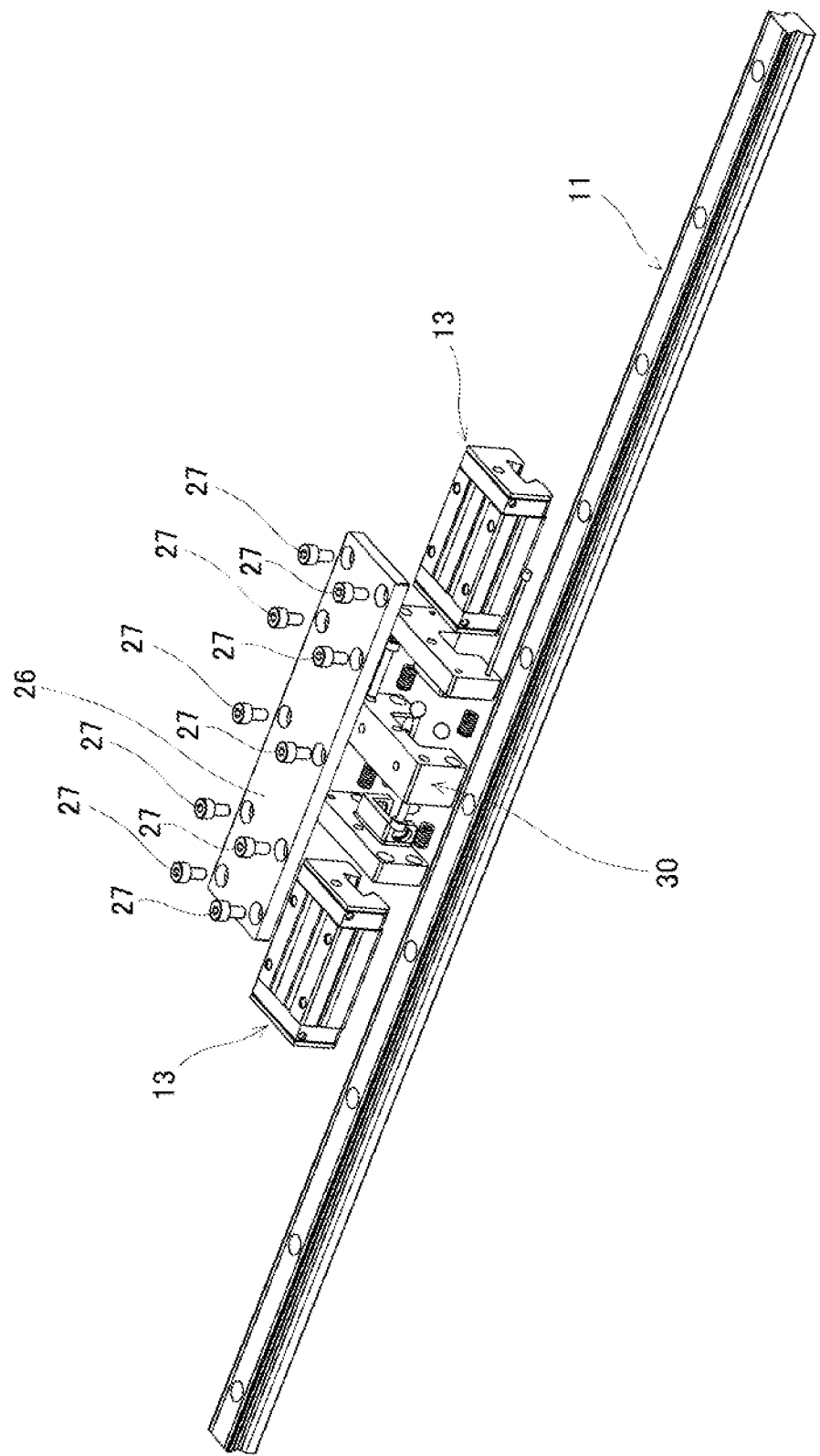

ENLARGED VIEW OF SECTION A-A

ENLARGED VIEW OF SECTION B-B

CLAMPER MECHANISM FOR MOTION GUIDE DEVICE

TECHNICAL FIELD

The present invention relates to a clamper mechanism for use in a motion guide device.

BACKGROUND ART

A motion guide device in which rolling elements such as balls and rollers are interposed in a guide portion as mechanical elements for guiding linear motion and curvilinear motion of a moving object such as a table provides an agile movement, and is thus utilized in various fields of robots, machine tools, semiconductor/liquid crystal manufacturing devices, medical equipment, and the like.

A linear guide which is a type of motion guide device is a device including a track rail serving as a track member formed to extend in the longitudinal direction and a movable block serving as a movable member attached to the track rail with the interposition of a plurality of rolling elements, in which the movable block is relatively movable in a reciprocating manner in the longitudinal direction of the track rail. The track rail has a rolling element rolling groove formed to extend in the longitudinal direction. On the other hand, the movable block has a load rolling element rolling groove formed to be opposite to the rolling element rolling groove, and is provided with a rolling element circulation passage for circulating the rolling elements. In addition, the rolling elements are arrayed between the rolling element rolling groove of the track rail and the load rolling element rolling groove of the movable block in a rollable manner in a loaded state. When the movable block linearly moves relative to the track rail, the rolling elements arrayed between the track rail and the movable block perform a rolling motion, and circulate endlessly in the rolling element circulation passage.

In a case of using a motion guide device such as the above-described linear guide, the position of the movable block on the track rail needs to be held at any position in some cases. There is a clamper mechanism for a motion guide device (linear guiding camper) described in Patent Literature 1 below, for example, disclosing a conventional technology for achieving such a request.

The clamper mechanism for a motion guide device (linear guiding clamper) disclosed in Patent Literature 1 below is a device that can be mounted on a track member of a rolling linear motion guide device including a rolling element rolling path extending in the axial direction, and including a camper body having a tapered face opposite to the rolling element rolling path of the track member, a clamping rolling element sandwiched between the tapered face of the clamper body and the rolling element rolling path of the track member, a retainer that holds the clamping rolling element, and biasing member that biases the clamper body and the retainer in a direction in which the clamping rolling element bites the tapered face. The clamper mechanism for a motion guide device (linear guiding clamper) described in Patent Literature 1 below having such characteristics can be incorporated into a linear guide device itself, and can provide a linear guiding camper that is compact and has a great molding force.

CITATION LIST

Patent Literature

Patent Literature 1

Japanese Patent Laid-Open No. 2015-48911

DISCLOSURE OF THE INVENTION

Problems to be Solved by the Invention

However, the clamper mechanism for a motion guide device (linear guiding clamper) disclosed in Patent Literature 1 above is configured such that the clamping rolling element on which a clamping force acts is pressed against the rolling element rolling path of the track member. Thus, an indented impression based on the clamping force may be produced on the rolling element rolling path, and performance and device life of the motion guide device itself may be affected. In addition, the technology disclosed in Patent Literature 1 diverts the rolling element rolling path, of the track member, and the dimensions of this rolling element rolling path are set considering the function as the motion guide device, rather than being set considering performance as the clamper mechanism. Thus, room for improvement is left for usage as a clamper mechanism for a motion guide device.

The present invention is made in view of the problems residing in the above-described conventional technology, and has an object to provide a clamper mechanism for a motion guide device that can exert a stable clamping force without affecting performance and device life of the motion guide device itself.

Means for Solving the Problems

A clamper mechanism for a motion guide device according to the present invention is a clamper mechanism for a motion guide device including a track member formed to extend in a longitudinal direction, and a movable member attached to the track member with an interposition of a plurality of rolling elements, the movable member being attached to the motion guide device relatively movable in a reciprocating manner in the longitudinal direction of the track member, the movable member being restrained/non-restrained at any position in the longitudinal direction of the track member to position the movable member with respect to the track member. The clamper mechanism includes: a clamper block formed in a substantially gate shape so as to cover an upper face and both left and right side faces of the track member, and having a pair of left and right tapered faces opposite to both the left and right side faces of the track member; one or more clamper rolling elements arranged respectively between the pair of left and right tapered faces included in the clamper block and both the left and right side faces of the track member; and a clamper rolling element holder having a clamper rolling element holding part that holds the clamper rolling elements, and attached to the clamper block with an interposition of an elastic member that exerts an elastic force. When the elastic force exerted by the elastic member acts in a direction in which the clamper block and the clamper rolling element holder are separated from each other, the clamper rolling elements bite the tapered faces to bring the clamper block into a state restrained to the track member. When an external force against the elastic force exerted by the elastic member acts to bring the clamper block and the clamper rolling element holder closer to each other, the clamper rolling elements are brought into a state freely rollable within the tapered faces to bring the camper block into a state not restrained to the track member.

Effects of the Invention

According to the present invention, a clamper mechanism for a motion guide device that can exert a stable clamping force without affecting performance and device life of the motion guide device itself can be provided.

BRIEF DESCRIPTION OF THE DRAWING'S

FIG. 4 is an exploded perspective view of the motion guide device in which the clamper mechanism for the motion guide device illustrated in FIG. 3 is installed.

Figure 5A:
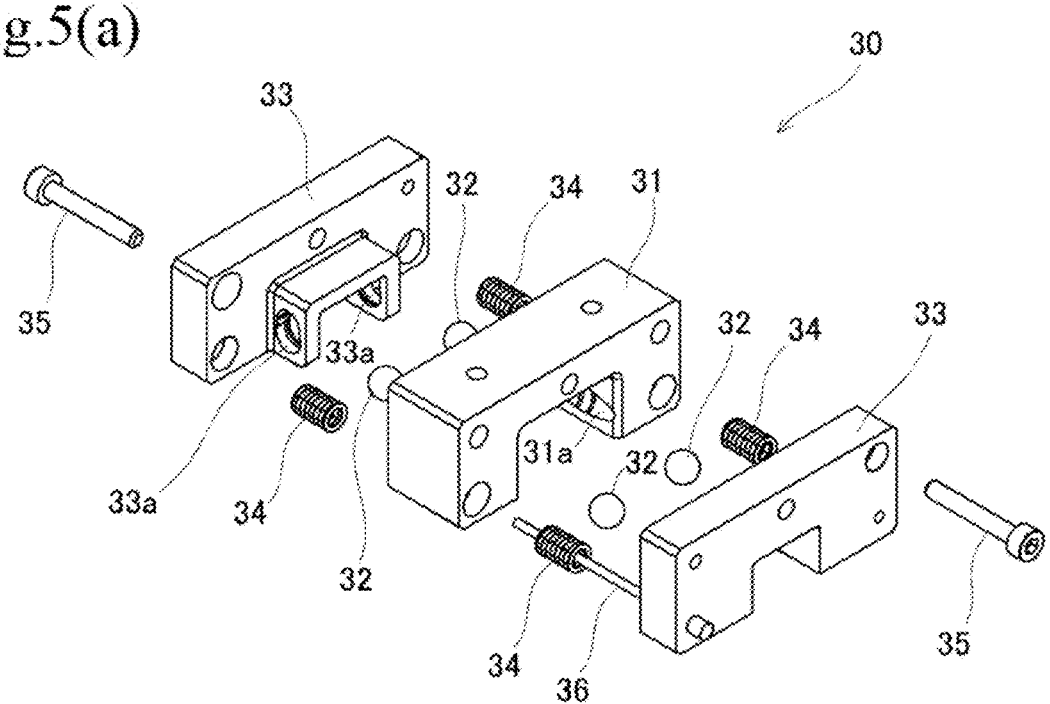
Figure 5B:
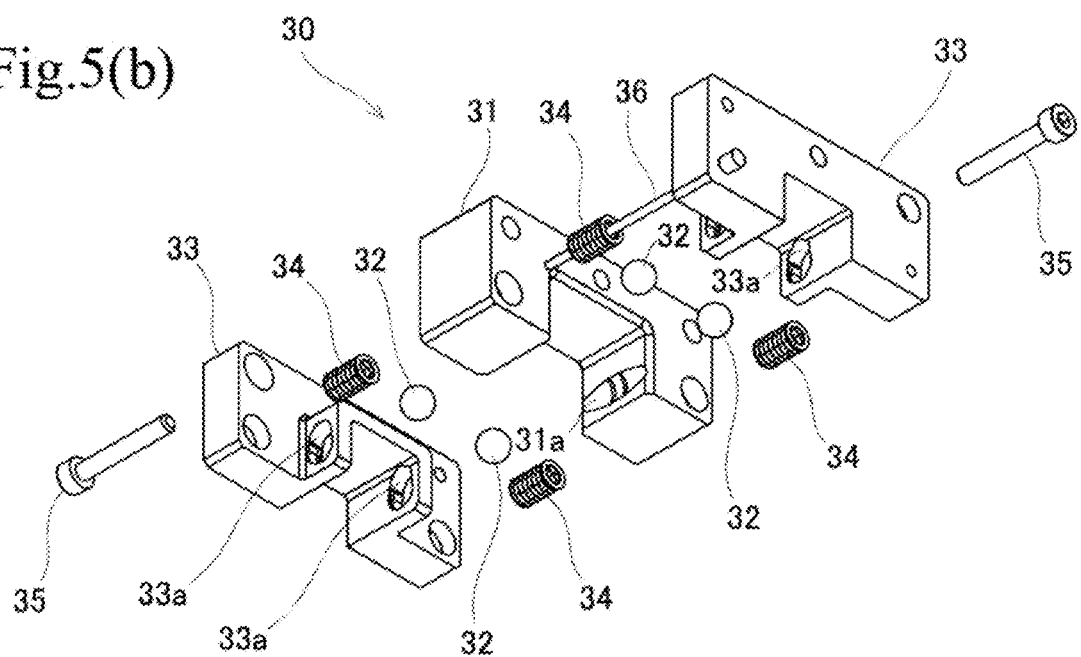

FIGS. 5(a) and 5(b) include exploded views for describing a specific configuration of the clamper mechanism for the motion guide device according to the present embodiment, where FIG. 5(a) is an exploded view as viewed diagonally from the upper side, and FIG. 5(b) is an exploded view as viewed diagonally from the bottom side.

Figure 6:
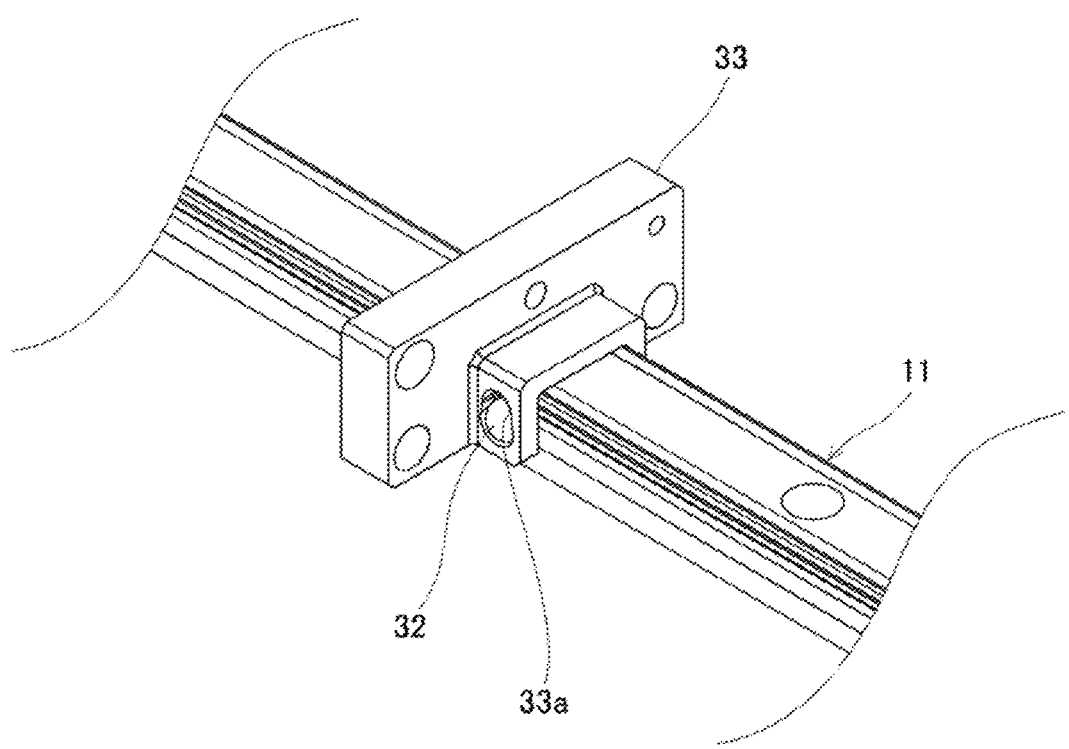

FIG. 6 is a schematic view for describing a state in which a clamper ball holder and clamper balls constituting the clamper mechanism for the motion guide device according to the present embodiment are attached to a track rail.

Figure 7A:
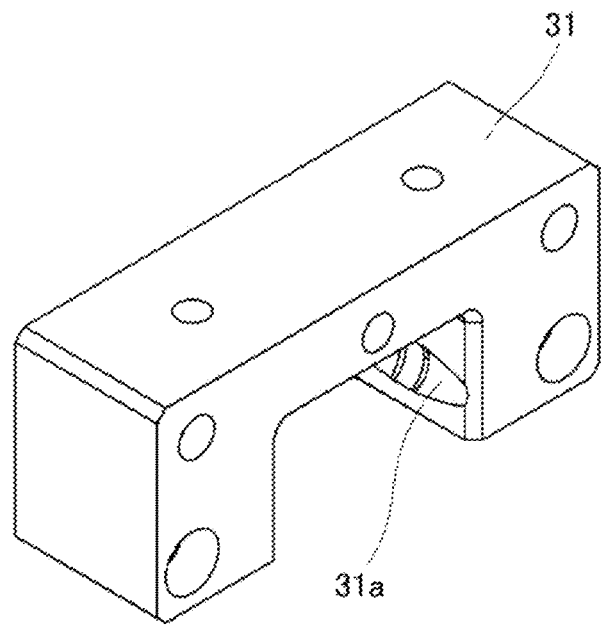
Figure 7B:
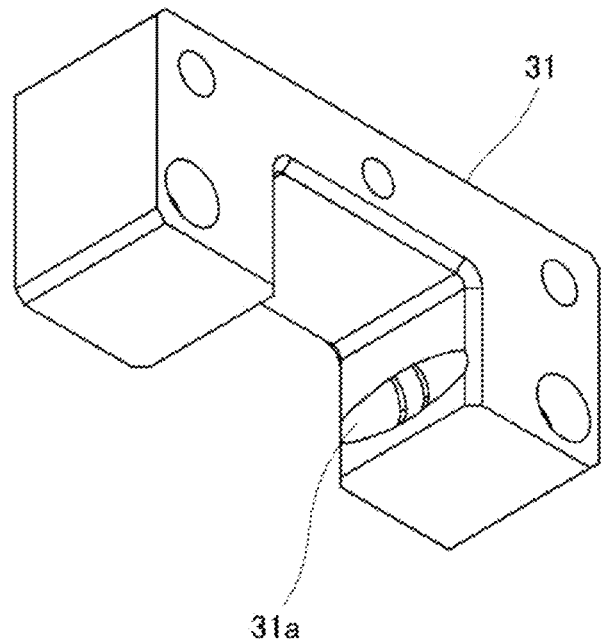

FIGS. 7(a) and 7(b) include external perspective views illustrating a shape of a clamper block constituting the clamper mechanism for the motion guide device according to the present embodiment, where FIG. 7(a) is an external perspective view as viewed diagonally from the upper side, and FIG. 7(b) is an external perspective view as viewed diagonally from the bottom side.

Figure 8:
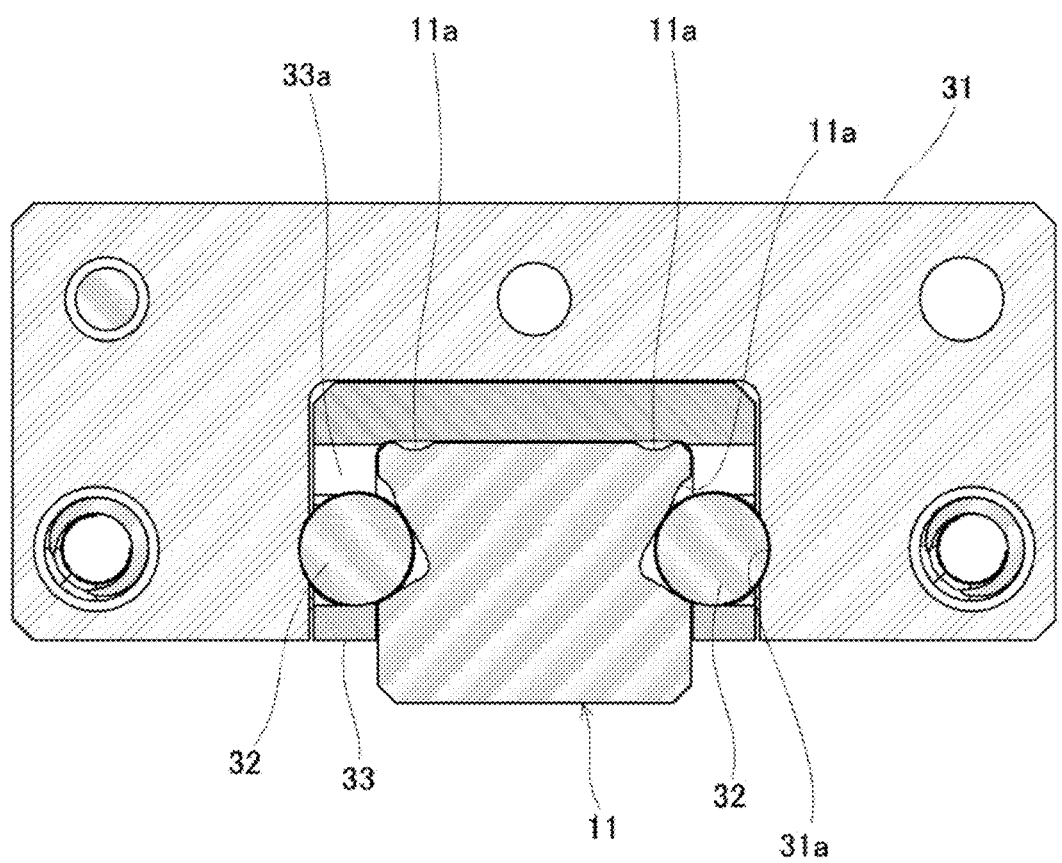

FIG. 8 is a vertical-sectional view for describing an attachment relationship between the clamper mechanism for the motion guide device according to the present embodiment and the track rail.

Figure 9:
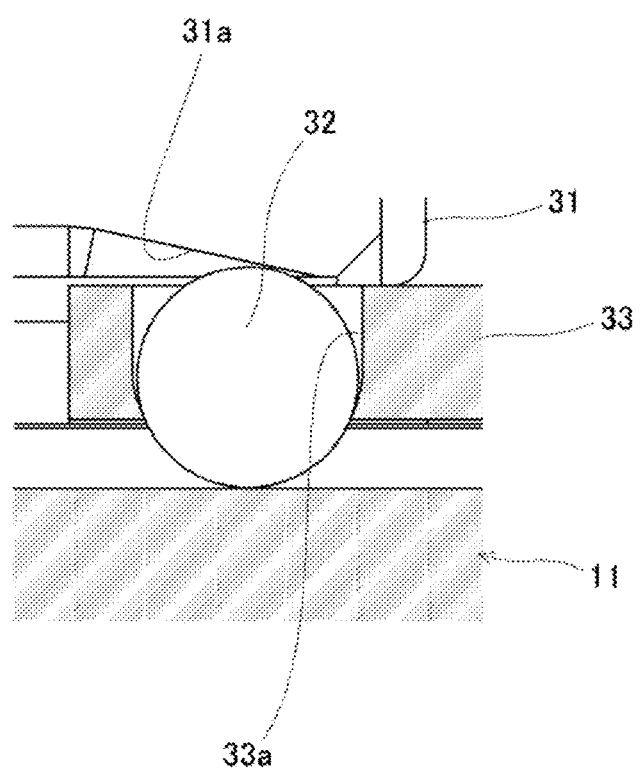

FIG. 9 is a cross-sectional view for describing an attachment relationship between the clamper mechanism for the motion guide device according to the present embodiment and the track rail.

Figure 10A:
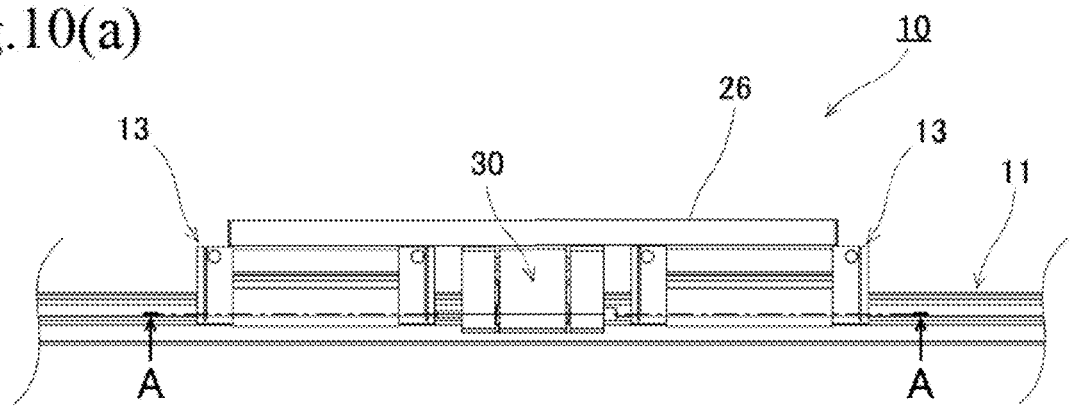
Figure 10B:
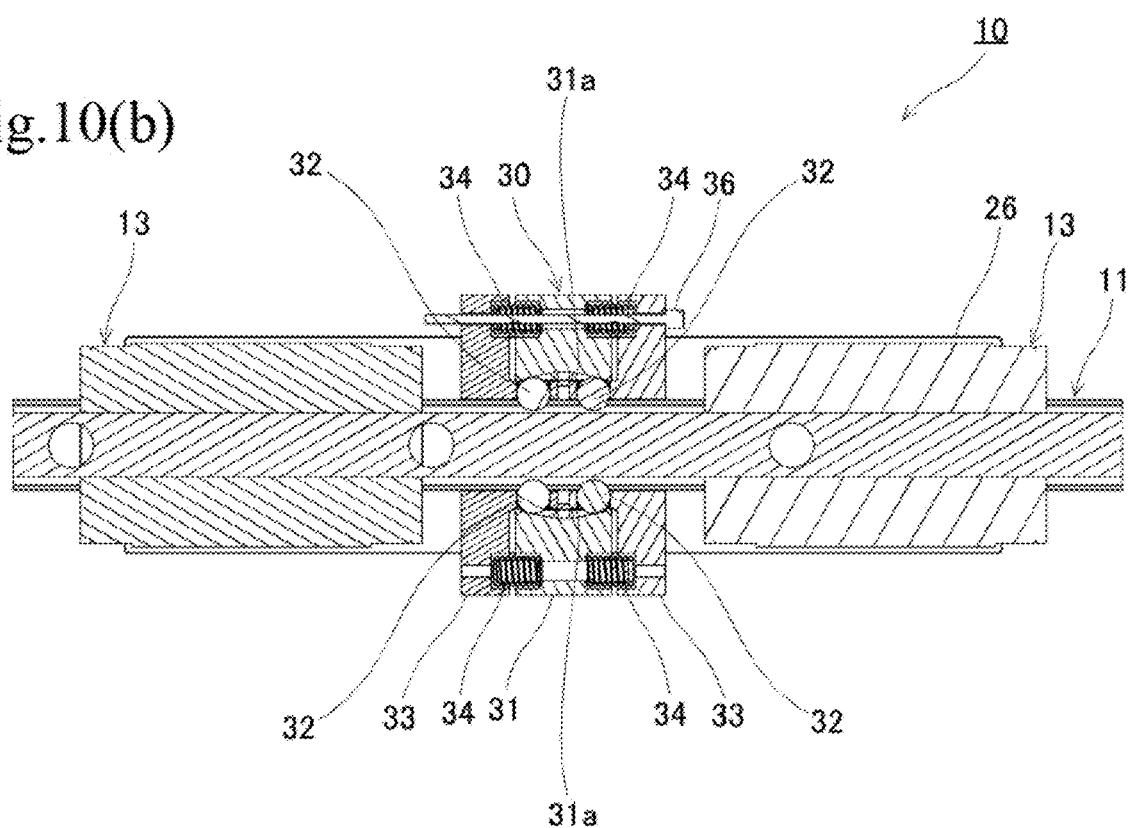

FIGS. 10(a) and 10(b) include diagrams illustrating a state in which the clamper mechanism for the motion guide device according to the present embodiment exerts a clamping force to restrain the movable block to the track rail, where FIG. 10(a) illustrates a side view of the clamper mechanism for the motion guide device, and FIG. 10(b) illustrates an enlarged view of a section A-A in FIG. 10(a).

Figure 11A:
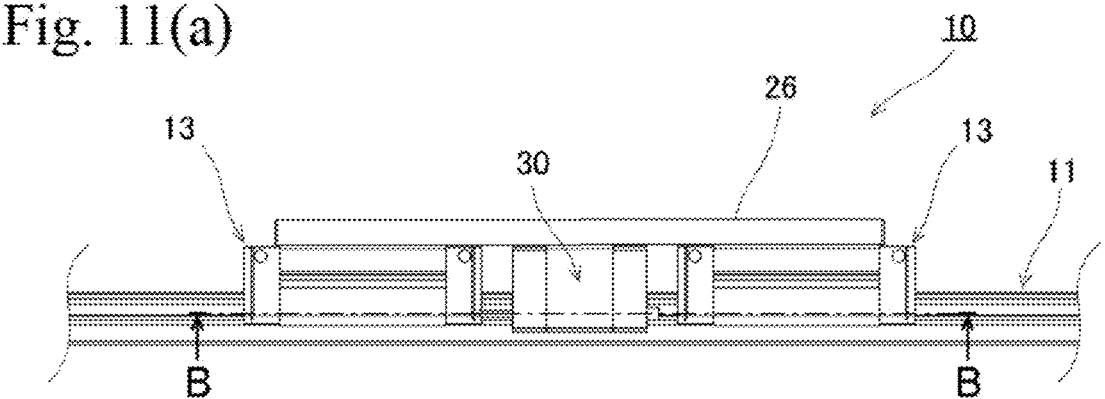
Figure 11B:
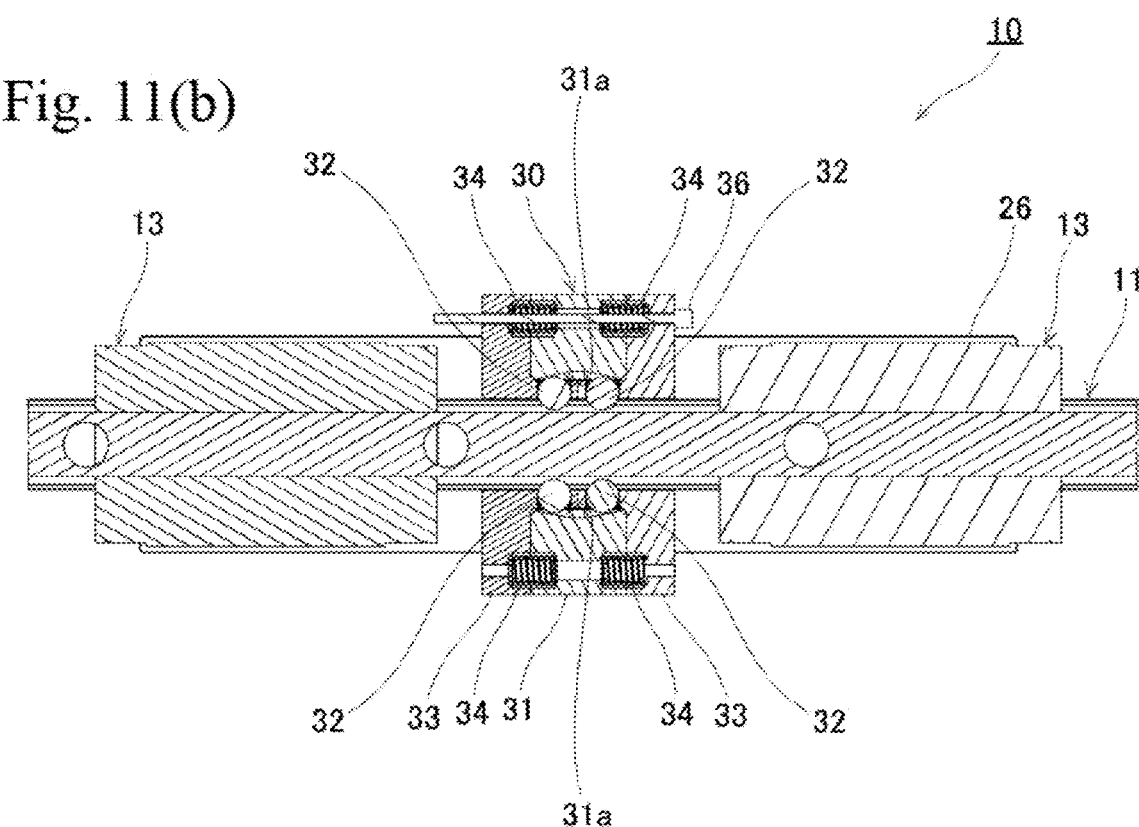

FIGS. 11(a) and 11(b) include diagrams illustrating a state in which the clamper mechanism for the motion guide device according to the present embodiment releases the clamping force, and the movable block is not restrained to the track rail, where FIG. 11(a) illustrates a side view of the clamper mechanism for the motion guide device, and FIG. 11(b) illustrates an enlarged view or a section B-B in FIG. 11(a).

Figure 12:
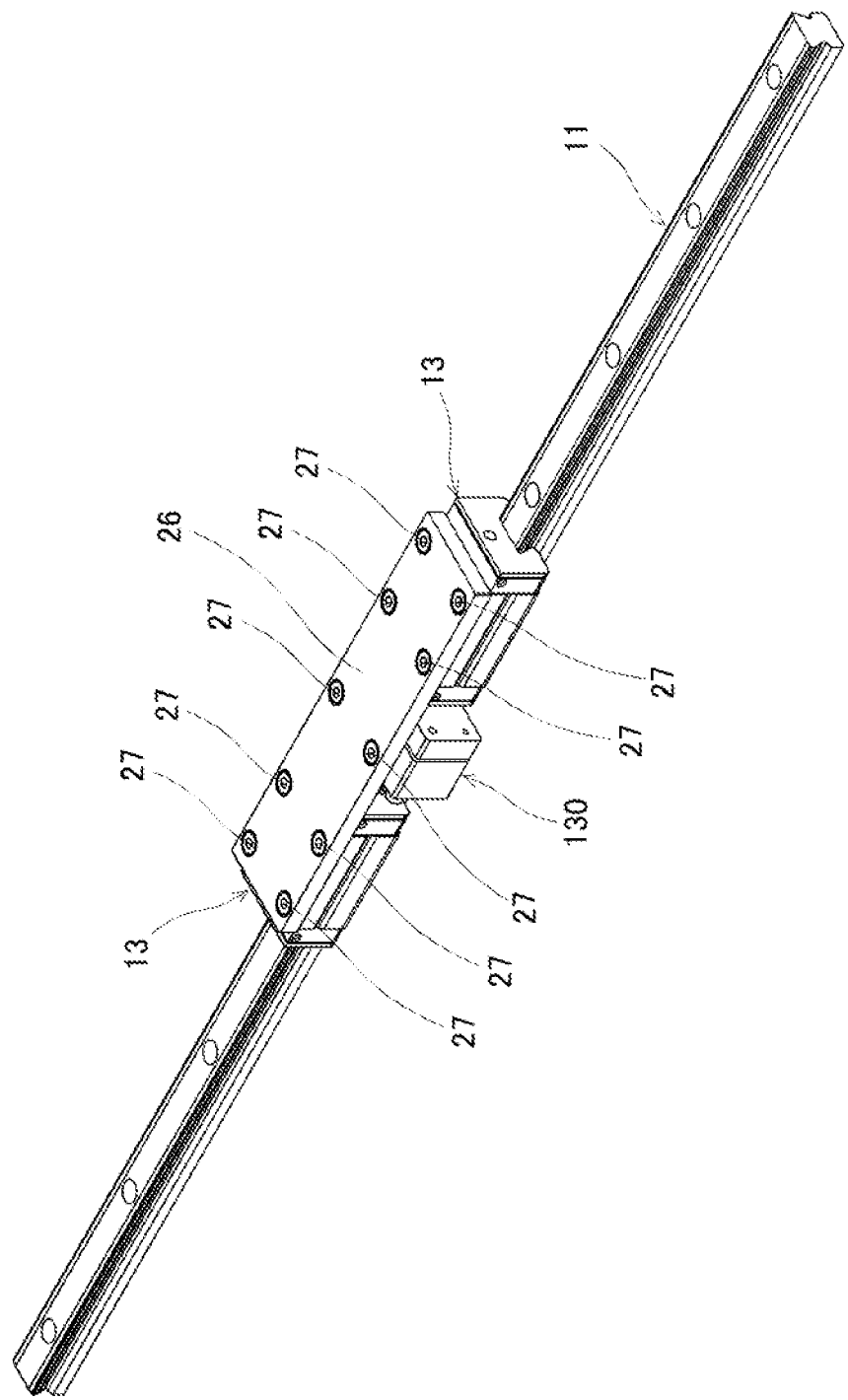

FIG. 12 is an external perspective view illustrating an overall configuration of a motion guide device in which a clamper mechanism for the motion guide device according to another embodiment is installed.

Figure 13:
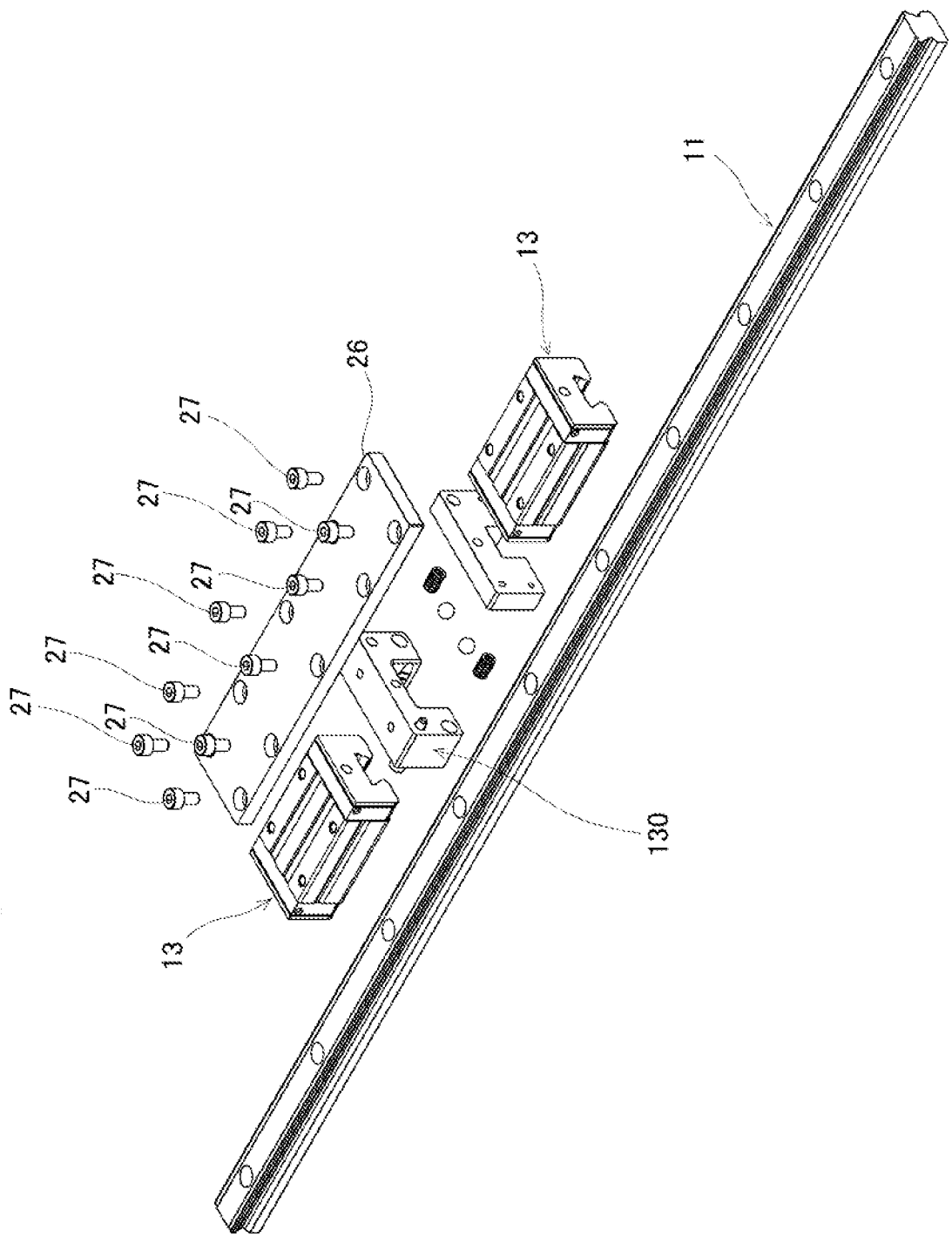

FIG. 13 is an exploded perspective view of the motion guide device in which the clamper mechanism for the motion guide device illustrated in FIG. 12 is installed.

Figure 14:
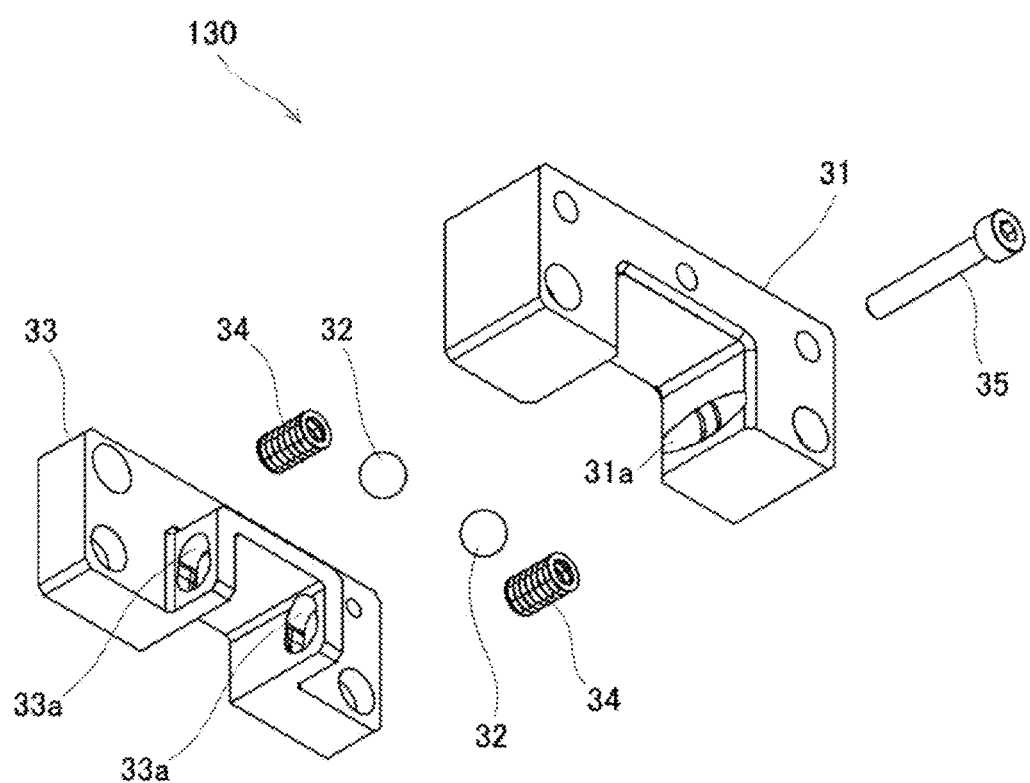

FIG. 14 is an exploded view for describing a specific configuration of the clamper mechanism for the motion guide device according to the other embodiment.

Figure 15A:
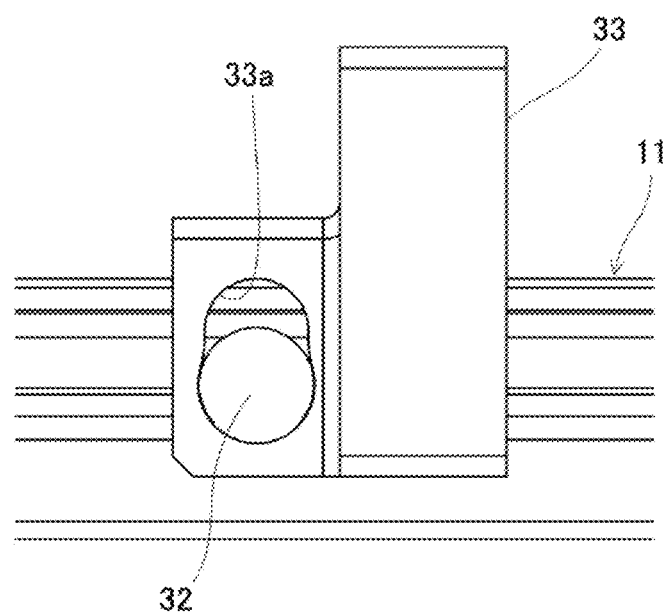
Figure 15B:
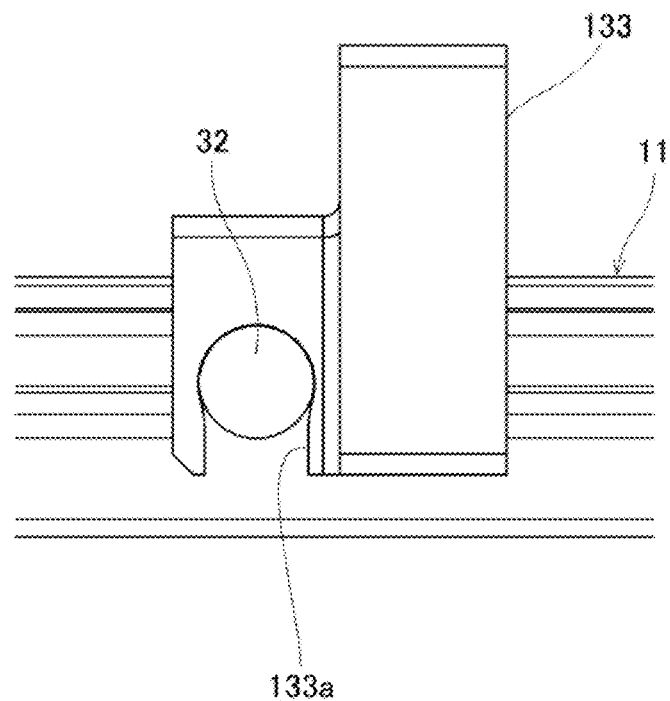

FIGS. 15(a) and 15(b) include diagrams illustrating examples of various through-hole shapes that may be presented by a clamper ball holding part as a thro ugh-hole formed in the clamper ball holder according to the present invention, where FIG. 15(a) is a diagram illustrating a form example of the present embodiment, and FIG. 15(b) is a diagram exemplifying a clamper ball holding part according to another embodiment.

MODE FOR CARRYING OUT THE INVENTION

Hereinafter, a preferred embodiment for carrying out the present invention will be described with reference to the drawings. The following embodiment does not limit the invention according to each claim, and all combinations of features described in the embodiment are not necessarily essential to the means for solving the invention.

Figure 1:
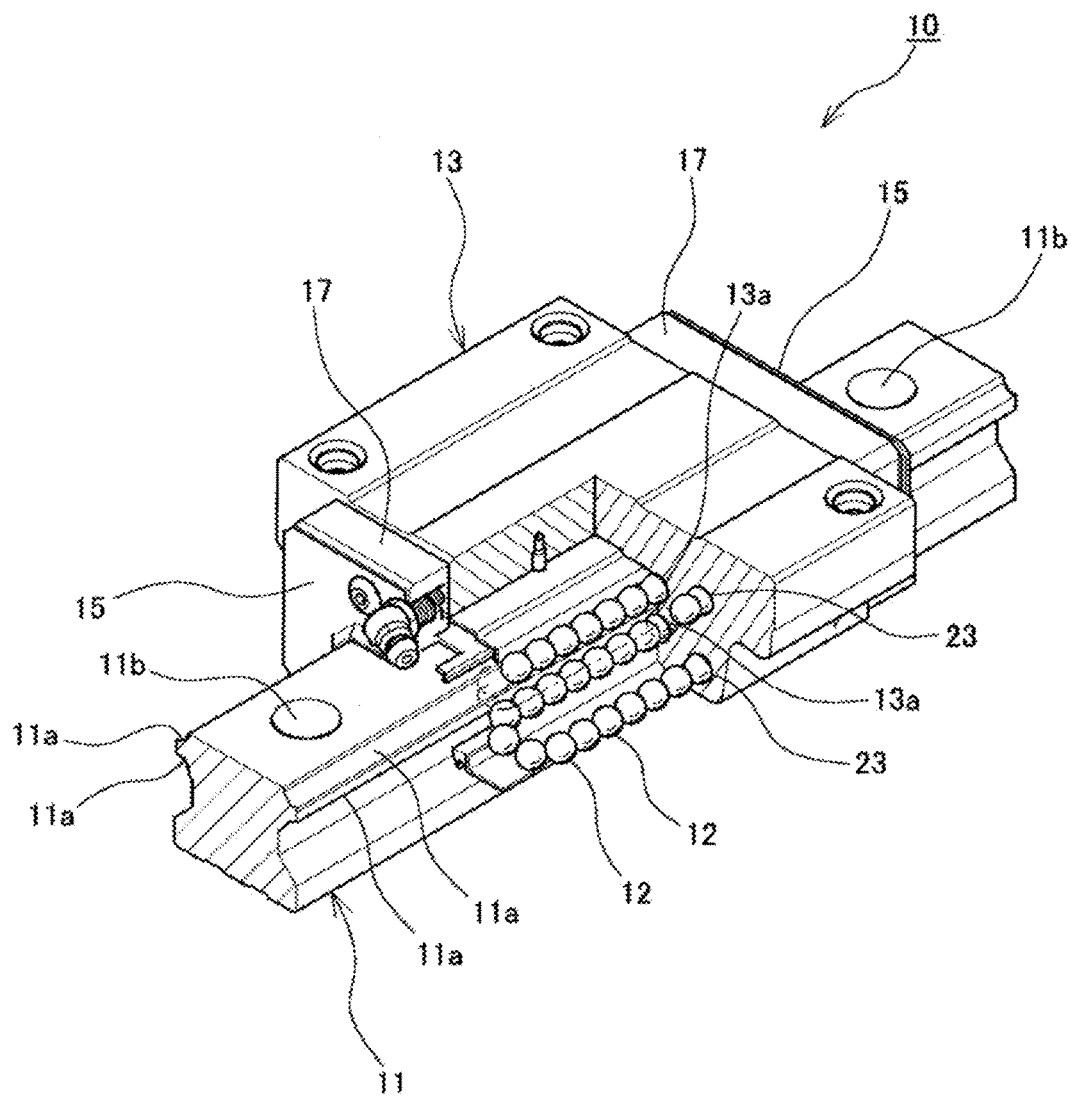
FIG. 1 is an external perspective view exemplifying one form of a linear guide which is a motion guide device that can include a clamper mechanism for the motion guide device according to the present embodiment.
Figure 2:
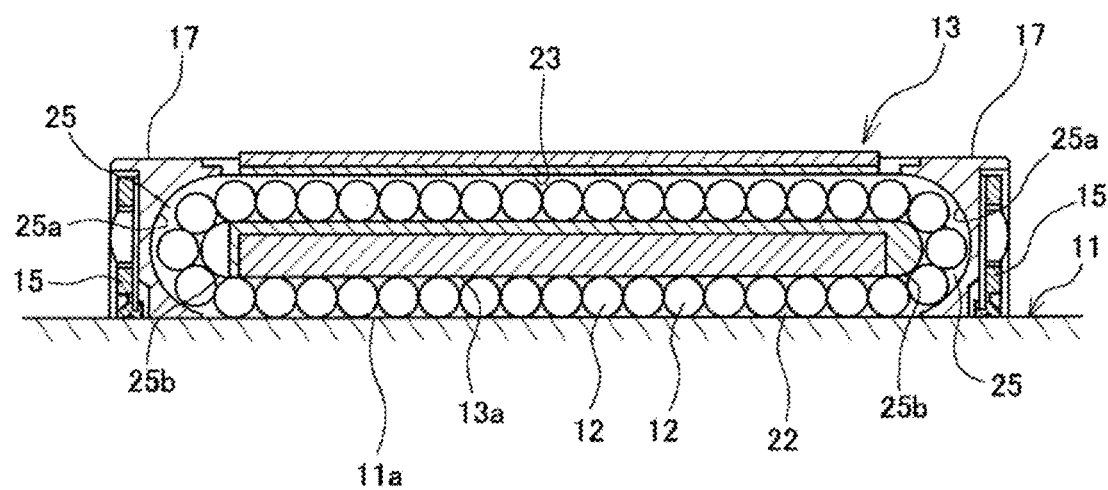
FIG. 2 is a sectional view for describing an endless circulation path included in the linear guide illustrated in FIG. 1.

First, an overall configuration of a linear guide 10 as a motion guide device that can include a clamper mechanism 30 for the motion guide device according to the present embodiment will be described with reference to FIGS. 1 and 2. Herein, FIG. 1 is an external perspective view exemplifying one form of the linear guide which is the motion guide device which can include the clamper mechanism for the motion guide device according to the present embodiment. FIG. 2 is a sectional view for describing an endless circulation passage included in the linear guide illustrated in FIG. 1.

The linear guide 10 as the motion guide device according to the present embodiment includes a track rail 11 serving as a track member and a movable block 13 serving as a movable member slidably attached to the track rail 11 with the interposition of balls 12 installed as a plurality of rolling elements. The track rail 11 has bolt holes 11b for attaching the track rail 11 to a base by inserting bolts serving as attaching means from the upper face to the lower face of the track rail 11, the bolt holes 11b being formed at equal intervals. The usage of the bolt holes 11b enables the track rail 11 to be fixedly installed on a base face. In addition, the track rail 11 is a long member whose cross section orthogonal to the longitudinal direction is formed in a substantially rectangular shape, and on the surface, a rolling element rolling face 11a as a track face to serve as a track when the balls 12 roll is formed over the entire length of the track rail 11.

The track rail 11 may be formed to extend linearly, or may be formed to extend curvilinearly. In addition, although the number of rolling element rolling faces 11a exemplified in FIGS. 1 and 2 is a total of four, two on the left and two on the right, the number of the faces can be changed as desired according to the application of the linear guide 10 or the like.

On the other hand, the movable block 13 is provided with load rolling element rolling faces 13a serving as track faces at positions corresponding to the rolling element rolling faces 11a. A load rolling element rolling path 22 is formed by the rolling element rolling face 11a of the track rail 11 and the load rolling element rolling face 13a of the movable block 13, and a plurality of balls 12 are sandwiched therebetween. In addition, the movable block 13 has four rolling element return passages 23 formed therein which extend in parallel with the respective rolling element rolling faces 11a.

Furthermore, a pair of lid members 17 and 17 are installed at both ends of the movable block 13 in the movement direction. The pair of lid members 17 and 17 are each provided with a turnabout passage 25. The turnabout passage 25 is configured to be able to connect an end of the rolling element return passage 23 and an end of the load rolling element rolling path 22. Therefore, one endless circulation passage is configured by a combination of one load rolling element rolling path 22, one rolling element return passage 23, and a pair of turnabout passages 25 and 25 connecting them (see FIG. 2).

Then, the plurality of balls 12 are installed so as to be able to endlessly circulate in the endless circulation passage configured by the load rolling element rolling path 22, the rolling element return passage 23, and the pair of turnabout passages 25 and 25. Thus, the movable block 13 is relatively movable in a reciprocating manner in the longitudinal direction of the track rail 11.

In addition, a pair of end seals 15 and 15 serving as sealing members are installed on the pair of lid members 17 and 17 so as to close the gap between the movable block 13 and the track rail 11 outside the pair of turnabout passages 25 and 25. The end seal 15 can be provided with a lip at a contact point with the track rail 11. Since the lip or the end seal 15 itself is in sliding contact with the track rail 11 without a gap, a dustproof effect can be provided to the linear guide 10.

Further, in the present embodiment, return plates not illustrated in FIGS. 1 and 2 are sandwiched between the movable block 13 and the pair of lid members 17 and 17. The return plate not illustrated exerts a function of closing the installation face of the lid member 17 on the movable block 13 as a first function, and plays a role of increasing airtightness between the movable block 13 and the lid member 17 by closing the gap present between the movable block 13 and the lid member 17. In addition, as a second function, the return plate not illustrated has an inner peripheral side passage face 25b of the turnabout passage 25, and is configured to cooperate with an outer peripheral side passage face 25a formed on the lid member 17 to form the turnabout passage 25.

Figure 3:
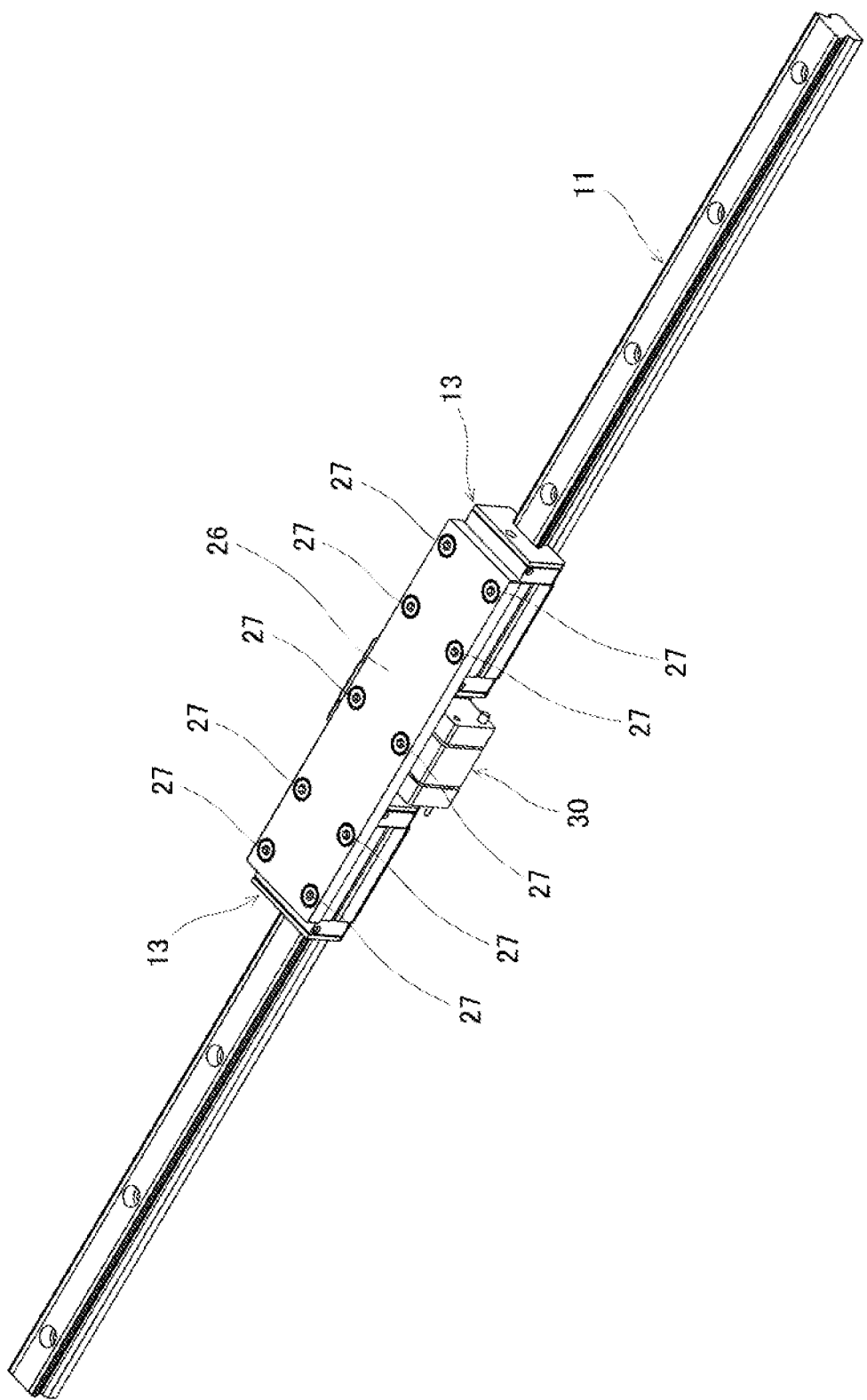
FIG. 3 is an external perspective view illustrating an overall configuration of the motion guide device in which the clamper mechanism for the motion guide device according to the present embodiment is installed.

The overall configuration of the linear guide 10 which can include the clamper mechanism 30 for the motion guide device according to the present embodiment has been described above. Next, a configuration of the clamper mechanism 30 for the motion guide device according to the present embodiment that can be suitably used for the above-described linear guide IC will be described with reference to FIGS. 3 to 9. Here, FIG. 3 is an external perspective view illustrating an overall configuration of the motion guide device in which the clamper mechanism or the motion guide device according to the present embodiment is installed, and FIG. 4 is an exploded perspective view of the motion guide device in which the clamper mechanism for the motion guide device illustrated in FIG. 3 is installed. In addition, FIGS. 5(a) and 5(b) include exploded views for describing a specific configuration of the clamper mechanism for the motion guide device according to the present embodiment, where FIG. 5(a) is an exploded view as viewed diagonally from the upper side, and FIG. 5(b) is an exploded view as viewed diagonally from the bottom side. Further, FIG. 6 is a schematic view for describing a state in which a clamper ball holder and clamper balls constituting the clamper mechanism for the motion guide device according to the present embodiment are attached to a track rail. In FIG. 6, members other than the clamper ball holder, the clamper balls, and the track rail are not illustrated for ease of description. Furthermore, FIGS. 7(a) and 7(b) include external perspective views illustrating a shape of a clamper block constituting the clamper mechanism for the motion guide device according to the present embodiment, where FIG. 7(a) is an external perspective view as viewed diagonally from the upper side, and FIG. 7(b) is an external perspective view as viewed diagonally from the bottom side. In addition, FIG. 8 is a vertical-sectional view for describing an attachment relationship between the clamper mechanism for the motion guide device according to the present embodiment and the track rail, and FIG. 9 is a cross-sectional view for describing an attachment relationship between the clamper mechanism for the motion guide device according to the present embodiment and the track rail.

As illustrated in FIGS. 3 and 4, in the present embodiment, two movable blocks 13 are installed for one track rail 11, and one clamper mechanism 30 for the motion guide device is installed so as to be sandwiched between the two movable blocks 13. A connection plate 26 is arranged on the upper side oi the one clamper mechanism 30 for the motion guide device and the two movable blocks 13. The connection plate 26 is mixed to the one clamper mechanism 30 for the motion guide device and the two movable blocks 13 with a plurality of bolts 27. In other words, since the one clamper mechanism 30 for the motion guide device and the two movable blocks 13 are integrated by the connection plate 26, these three members are configured to integrally move in a reciprocating manner in the longitudinal direction of the track rail 11. Further, although a detailed structure will be described later, the restrained/non-restrained state of the clamper mechanism 30 for the motion guide device according to the present embodiment can be achieved at any position in the longitudinal direction of the track rail 11, and the clamper mechanism 30 for the motion guide device and the two movable blocks 13 are integrated. Thus, the movable block 13 can be positioned on the track rail 11. Note that the restrained/non-restrained state of the clamper mechanism 30 for the motion guide device according to the present embodiment exemplified in FIGS. 3 to 7 can be achieved in either direction (that is, both directions of the right downward direction on the sheet of drawing and left upward direction on the sheet of drawing in FIG. 3) in the longitudinal direction of the track rail 11.

Next, a specific structure of the camper mechanism 30 for the motion guide device according to the present embodiment will be described with reference to FIGS. 5(a) to 9. As illustrated in FIGS. 5(a) and 5(b), the clamper mechanism 30 for the motion guide device according to the present embodiment includes one clamper block 31, four clamper balls 32 serving as clamper rolling elements, two clamper ball holders 33 serving as clamper rolling element holders, four coil springs 34 serving as elastic members that exert an elastic force, two connection bolts 35 for connecting the clamper block 31 and the clamper ball holders 33, and an operation wire 36.

The clamper block 31 is a member formed in a substantially gate shape so as to cover the upper face and both left and right side faces which are faces of the track rail 11 excluding the bottom face. As illustrated in FIGS. 5 and 7, a pair of left and right tapered faces 31a and 31a are formed in regions opposite to both the left and right side faces of the track rail 11 on the inner wall face of the substantially gate shape of the clamper block 31.

The tapered face 31a formed in the clamper block 31 is formed such that a face depth becomes the maximum depth at a central part of the tapered face 31a, and configured such that the face depth becomes shallower toward an end side of the tapered face 31a. In addition, since the tapered face 31a has a sectional shape formed by a circular arc groove having a single arc shape, the clamper ball 32 arranged on the tapered face 31a is configured to come into surface contact with the tapered face 31a (see FIG. 8).

In addition, in the present embodiment, the two clamper ball holders 33 are installed so as to sandwich the above-described one camper block 31 from both the sides in the longitudinal direction of the track rail 11. The clamper ball holder 33 has a clamper ball holding part 33a formed as a through-hole for holding the clamper ball 32. Since a region where the camper ball holding cart 33a is formed is arranged in an inserted manner into the inner wall face so as to be opposite to the inner wall face of the substantially gate shape of the clamper block 31, the clamper ball 32 held by the clamper ball holding part 33a is stored within the face of the tapered face 31a formed in the clamper block 31.

In addition, the clamper ball holder 33 is attached to the clamper block 31 with the interposition of the coil springs 34 that exert an elastic force, and is further connected with the connection bolt 35. The connection bolt 35 is coupled by screwing only to the clamper block 31, and with respect to the clamper ball holder 33, the bolt head of the connection bolt 35 inserted through a bolt hole formed in the camper ball holder 33 is merely in contact with an outer face of the clamper ball holder 33.

Therefore, the state in which the clamper ball holder 33 is attached to the clamper block 31 is such that in a normal state, the clamper ball holder 33 receives a force in a direction away from the clamper block 31 by the elastic force exerted by the coil springs 34, and the position of the clamper ball holder 33 with respect to the clamper block 31 is defined by the position of the bolt head of the connection bolt 35. Note that in this normal state, the clamper ball 32 held by the clamper ball holding part 33a is positioned at the end side of the tapered face 31a formed in the clamper block 31, that is, at the location where the face depth of the tapered face 31a is shallow.

On the other hand, in a case where such an external force against the elastic force exerted by the coil springs 34 that brings the clamper ball holder 33 closer to the clamper block 31 acts, the clamper ball holder 33 is released from the contact state with the bolt head of the connection bolt 35, and moves along a screw shaft of the connection bolt 33 so as to come closer to the clamper block 31. At this time, the clamper ball 32 held by the clamper ball holding part 33a is positioned at the central part of the tapered face 31a formed in the clamper block 31, that is, in the vicinity of the location where the face depth of the tapered face 31a becomes the maximum depth.

The above-described clamper balls 32 are arranged between the pair of left and right tapered faces 31a included in the clamper block 31 and both the left and right side faces of the track rail 11 in a state clutched by the clamper ball holding parts 33a. In particular, in the present embodiment, since both the left and right side faces of the track rail 11 have recesses having a substantial fallen L-shape as illustrated in FIG. 8, the clamper balls 32 arranged between the tapered faces 31a each formed by a circular arc groove having a single arc shape and both the left and right side faces of the track rail 11 come into contact with the track rail 1 at two points, and come into surface contact with the clamper blocks 31, which means a state of contact at a total of three locations, two points and one face. Therefore, a stable contact state with the track rail 11 and the clamper blocks 31 is achieved for the clamper balls 32 according to the present embodiment. Such a contact state enables more advantageous effects in terms of cost to be obtained than in the conventional technology, such as elimination of necessity to carry out quenching processing at the contact locations between the crack rail 11 and the clamper balls 32, for example. In addition, in the present embodiment, since the clamper balls 32 which will exert a clamping force come into contact with both the left and right side faces of the track rail 11, and the clamper balls 32 do not come into contact with a location where exertion of the performance of the motion guide device, such as the rolling element rolling face 11a, for example, is affected, a stable clamping force can be exerted without affecting performance and device life of the motion guide device itself (see FIG. 8).

Further, the clamper balls 32 according to the present embodiment have a diameter larger than that of the plurality of balls 12 included in the linear guide 10. Therefore, the clamper mechanism 30 for the motion guide device according to the present embodiment can exert a more suitable clamping force than in the conventional technology in which a guiding motion and a clamp mechanism are both achieved by balls having the same diameter.

Further, when in the normal state in which the elastic force exerted by the coil springs 34 acts in a direction in which the clamper block 31 and the clamper ball holder 33 are separated from each other, the clamper ball 32 is positioned at the end side of the tapered face 31a formed in the clamper block 31, that is, at the location where the face depth of the tapered face 31a is shallow. Thus, the clamper ball 32 sandwiched between a side face of the track rail 11 and the tapered face 31a bites the tapered face 31a to achieve a state in which the clamper block 31 is restrained to the track rail 11. On the other hand, when an external force against the elastic force exerted by the coil springs 34 acts to bring the clamper block 31 and the clamper ball holder 33 closer to each other, the clamper ball 32 is positioned at the central part of the tapered face 31a formed in the clamper block 31, that is, in the vicinity of the location where the face depth of the tapered face 31a becomes the maximum depth. Thus, the clamper ball 32 sandwiched between a side face of the track rail 11 and the tapered face 31a is brought into a state freely rollable within the tapered face 31a to achieve a state in which the clamper block 31 is not restrained to the track rail 11. Such a configuration enables the clamper mechanism 30 for the motion guide device according to the present embodiment to achieve a state in which a suitable clamping force is exerted and a released state.

Note that the clamper mechanism 30 for the motion guide device according to the present embodiment is configured such that positions at which the four clamper balls 32 are arranged and positions at which the four coil springs 34 are arranged are at a substantially identical height position when the track rail 11 is viewed from a side face (see FIGS. 5(a), 5(b) and 6, and the like). The clamper mechanism 30 for the motion guide device according to the present embodiment having such a configuration enables the movement of separating the clamper ball holder 33 from the clamper block 31 and the movement of bringing the clamper ball holder 33 closer to the clamper block 31 to be carried out in a balanced manner and smoothly.

In addition, in the present embodiment, the clamper ball holding part 33a that holds the clamper ball 32 is formed as a through-hole for holding the clamper ball 32 as described above, and the through-hole is formed in a substantially bicircular shape (see FIGS. 5(a), 5(b), 6, and the like). This substantially bicircular shape refers to a shape in which two circular shapes are combined, and more specifically, a shape in which a central portion of an ellipse is constricted. In addition, as illustrated in FIG. 9, the sectional shape of the clamper ball holding part 33a is formed in a substantially bowl-like sectional shape that clutches the clamper ball 32 toward the track rail 11 and is open toward the tapered face 31a. Herein, in the clamper mechanism 30 for the motion guide device according to the present embodiment, the clamper block 31 is formed of a metal material, while the clamper ball holder 33 is formed of a resin material. Then, a method of installing the clamper ball 32 on the clamper ball holding part 33a is carried out while pressing the clamper ball 32 into the clamper ball holding part 33a made of a resin material in a state in which the clamper block 31 and the clamper ball holder 33 are assembled to deform the shape of the clamper ball holding part 33a formed in a substantially bowl-like sectional shape. Therefore, by forming the through-hole that forms the clamper ball holding part 33a in a substantially bicircular shape as illustrated in FIGS. 5, 6, and the like, the through-hole having a substantially bicircular shape in which two circular shapes are combined is easier to be deformed in shape of the through-hole when fitting the clamper ball 32 within the through-hole, and it is easier to fit the clamper ball 32 within the through-hole than in the case of a through-hole having a single circular shape. Thus, the present embodiment enables the clamper ball 32 to be pressed and installed reliably and easily. In addition, by forming the sectional shape of the clamper ball holding part 33a in a substantially bowl-like sectional shape as illustrated in FIG. 9, the action of the clamper ball holding cart 33a that clutches the clamper ball 32 which is the action of the substantially bowl-like sectional shape prevents the clamper ball 32 from dropping off the clamper mechanism 30 for the motion guide device if the camper mechanism 30 for the motion guide device is detached from the track rail 11. This enables an effect such as, for example, facilitating work when re-assembling the clamper mechanism 30 for the motion guide device to the track rail 11 to be obtained.

In addition, a manual operation by an operator can be employed as means for achieving the movement of bringing the clamper ball holder 33 closer to the clamper block 31. However, the means for achieving the movement of bringing the clamper ball holder 33 closer to the clamper block 31 in the clamper mechanism 30 for the motion guide device according to the present embodiment is not limited to a manual operation. For example, the operation wire 36 illustrated in FIGS. 5(a) and 5(b) and the like can be utilized as the means for achieving the movement of bringing the clamper ball holder 33 closer to the clamper block 31. The operation wire 36 has, for example, a wire bridged so as to conduct the clamper mechanism 30 for the motion guide device as a whole, a nipple fixedly installed at the leading end of the wire, and an outer tube that covers the wire in a state movable in an axial line direction, and then, by installing the nipple and the outer tube so as to sandwich the outer sides of the two clamper ball holders 33 to enable an external force for performing the movement of bringing the clamper ball holder 33 closer to the clamper block 31, that is, an external force against the elastic force exerted by the coil springs 34 to occur when the wire is pulled to narrow the interval between the nipple and the outer tube.

In addition, in the normal state of the above-described clamper mechanism 30 for the motion guide device according to the present embodiment, the connection bolt 35 for connecting the clamper block 31 and the clamper ball holder 33 is not completely screwed into the clamper block 31, but is installed in a state leaving a movement margin within a range where the movement of separating the clamper ball holder 33 from the clamper block 31 and the movement of bringing the clamper ball holder 33 closer to the clamper block 31 can be performed. However, by completely screwing the connection bolt 35, the clamper block 31 and the clamper ball holder 33 can be fixedly held in a state brought closer to each other, and it is possible to cause the connection bolt 35 to function as fixedly holding means. Since the clamper block 31 and the clamper ball holder 33 are fixedly held in the state brought closer to each other by causing the connection bolt 35 to function as the fixedly holding means, a state in which the clamper block 31 is not restrained to the track rail 11 can be maintained all the time.

The specific structure of the clamper mechanism 30 for the motion guide device according to the present embodiment has been described above with reference to FIGS. 3 to 9. Next, also with reference to FIGS. 10(a) to 11(b), a movement of the clamper mechanism 30 for the motion guide device according to the present embodiment will be described. Here, FIGS. 10(a) and 10(b) include diagrams illustrating a state in which the clamper mechanism for the motion guide device according to the present embodiment exerts a clamping force to restrain the movable block to the track rail, where FIG. 10(a) illustrates a side view of the clamper mechanism for the motion guide device, and FIG. 10(b) illustrates an enlarged view of a section A-A in FIG. 10(a). In addition, FIGS. 11(a) and 11(b) include diagrams illustrating a state in which the clamper mechanism for the motion guide device according to the present embodiment releases the clamping force, and the movable block is not restrained to the track rail, where FIG. 11(a) illustrates a side view of the clamper mechanism for the motion guide device, and FIG. 11(b) illustrates an enlarged view of a section B-B in FIG. 11(a).

Since FIGS. 10(a) and 10(b) show a state in which an external force on the clamper ball holder 33 has not been applied, the elastic force exerted by the coil springs 34 acts in a direction in which the clamper block 31 and the clamper ball holder 33, are separated from each other. In such a normal state, the clamper ball 32 is positioned at the end side of the tapered face 31a formed in the clamper block 31, that at the location where the face depth of the tapered face 31a is shallow as illustrated in FIG. 10(b). Thus, the clamper ball 32 sandwiched between a side face of the track rail 11 and the tapered face 31a is in a state biting the tape-red face 31a. Therefore, the clamper block 31 is brought into a state restrained to the track rail 11.

On the other hand, in a case where an external force of bringing the clamper ball holder 33 closer to the clamper block 31 is applied by operating the operation wire 36 or by applying an external force manually by an operator, the external force acts as a force against the elastic force exerted by the coil springs 34 to bring a state in which the clamper block 31 and the clamper ball holder 33 come closer to each other. At this time, the clamper ball 32 is positioned at the central part of the tapered face 31a formed in the clamper block 31, that is, in the vicinity of the location where the face depth of the tapered face 31a becomes the maximum depth as illustrated in FIG. 11(b). Thus, the clamper ball 32 sandwiched between a side face of the track rail 11 and the tapered face 31a is brought into a state freely rollable within the tapered race 31a. Therefore, the clamper block 31 is brought into a state not restrained to the track rail 11.

Although a suitable embodiment of the present invention has been described above, the technical scope of the present invention is not limited to the scope described in the above embodiment. Various modifications and improvements can be made for the above embodiment.

The clamper mechanism 30 for the motion guide device according to above-described embodiment employs a configuration in which the two clamper ball holders 33 are installed so as to sandwich one clamper block 31 from both the sides in the longitudinal direction of the track rail 11. In this case, the restrained/non-restrained state of the clamper mechanism 30 for the motion guide device can be achieved in either direction in the longitudinal direction of the track rail 11 (that is, both directions of the right downward direction on the sheet of drawing and the left upward direction on the sheet of drawing in FIG. 3). However, the scope of the present invention is not limited to the above-described embodiment. For example, a configuration in which one clamper rolling element holder is installed for one clamper block can be employed for the clamper mechanism for the motion guide device according to the present invention. FIGS. 12 to 14 are illustrated as drawings illustrating such another embodiment of the present invention. Here, FIG. 12 is an external perspective view illustrating an overall configuration of a motion guide device in which clamper mechanism for the motion guide device according to another embodiment is installed, and FIG. 13 is an exploded perspective view of the motion guide device in which the clamper mechanism for the motion guide device illustrated in FIG. 12 is installed. In addition, FIG. 14 is an exploded view for describing a specific configuration of the clamper mechanism for the motion guide device according to the other embodiment. Note that the same members as or similar members to those in the above-described embodiment may be denoted by the same reference characters, and may be omitted from description in the following description.

As illustrated in FIGS. 12 and 13, in the other embodiment, two movable blocks 13 are installed for one track rail 11, and one clamper mechanism 130 for the motion guide device is installed so as to be sandwiched between the two movable blocks 13. The connection plate 26 is arranged on the upper side of the one clamper mechanism 130 for the motion guide device and the two movable blocks 13. The connection plate 26 is fixed to the one clamper mechanism 130 for the motion guide device and the two movable blocks 13 with the plurality of bolts 27. In other words, the one clamper mechanism 130 for the motion guide device and the two movable blocks 13 are integrated by the connection plate 26, so that these three members are configured to integrally move in a reciprocating manner in the longitudinal direction of the track rail 11. Further, the restrained/non-restrained state of the clamper mechanism 130 for the motion guide device according to the other embodiment can be achieved at any position in the longitudinal direction of the track rail 11, and the clamper mechanism 130 for the motion guide device and the two movable blocks 13 are integrated. Thus, the movable blocks 13 can be positioned on the track rail 11. Note that the restrained/non-restrained state of the clamper mechanism 130 for the motion guide device according to the other embodiment exemplified in FIGS. 12 to 14 can be achieved only in one direction in the longitudinal direction of the track rail 11 (that is, in the left upward direction on the sheet of drawing in FIG. 12), and there is no restrained/non-restrained state in the other direction (that is, in the right downward direction on the sheet of drawing in FIG. 12), so that the movable blocks 13 can move freely with respect to the track rail 11.

As illustrated in FIG. 14, the clamper mechanism 130 for the motion guide device according to the other embodiment has the one clamper block 31, the two clamper balls 32 serving as clamper rolling elements, the one clamper ball holder 33 serving as a clamper rolling element holder, the two coil springs 34 serving as elastic members that exert an elastic force, and the one connection bolt 35 for connecting the clamper block 31 and the clamper ball holder 33.

The state in which the clamper ball holder 33 is attached to the clamper block 31 is such that in a normal state, the clamper ball holder 33 receives a force in a direction away from the clamper block 31 by the elastic force exerted by the coil springs 34, and the position of the clamper ball holder 33 with respect to the clamper block 31 is defined by the position of the bolted of the connection bolt 35. Note that in this normal state, the clamper ball 32 held by the clamper ball holding part 33a is positioned at the end side of the tapered face 31a formed in the claimer block 31, that is, at the location where the face depth of the tapered face 31a is shallow. In the case of this state, the clamper ball 32 sandwiched between a side face of the track rail 11 and the tapered face 31a bites the tapered face 31a to achieve a state in which the clamper block 31 is restrained to the track rail 11. Note that in this restrained state, the movable block 13 is restrained from moving in a direction to the opposite side of the side where the clamper ball holder 33 is installed as viewed from the clamper block 31.

On the other hand, in a case where such an external force against the elastic force exerted by the coil springs 34 that brings the clamper ball holder 33 closer to the clamper block 31 acts, the clamper ball holder 33 is released from the contact state with the bolt head of the connection bolt 35, and moves along the screw shaft of the connection bolt 35 so as to come closer to the clamper block 31. At this time, the clamper ball 32 held by the clamper ball holding part 33a is positioned at the central part of the tapered face 31a formed in the camper block 31, that is, in the vicinity of the location where the face depth of the tapered face 31a becomes the maximum depth. In the case of this state, the clamper ball 32 sandwiched between a side face of the track rail 11 and the tapered face 31a is brought into a state freely rollable within the tapered face 31a to achieve a state in which the clamper block 31 is not restrained to the track rail 11.

In addition, the above-described embodiment has exemplified the shape of the clamper ball holding part 33a as the through-hole for holding the clamper ball 32 in the case where the through-hole is formed in a substantially bicircular shape (see FIGS. 5(a), 5(b) and 6, and the like). However, the shape of the through-hole of the clamper ball holding part 33a as the through-hole formed in the clamper ball holder 33 can present various deformed forms within a range where actions and effects similar to those of the above-described embodiment are exerted. For example, FIG. 15(a) and 15(b) include diagrams illustrating examples of various through-hole shapes that may be presented by the clamper ball holding part as a through-hole formed in the clamper ball holder according to the present invention, where FIG. 15(a) is a diagram illustrating the above-described form example of the present embodiment, and FIG. 15(b) is a diagram exemplifying a clamper ball holding part according to another embodiment. As illustrated in FIG. 15(b), a clamper ball holding part 133a formed in a clamper ball bolder 133 according to the other embodiment is configured as a notch-shaped part that is open downward. Instead of the through-hole having a substantially bicircular shape such as the clamper ball holding part 33*a* according to the above-described embodiment, the clamper ball holding part 133*a* can be configured as the notch-shaped part that is open downward.

It is obvious that embodiments obtained by making such modifications or improvements may also be included in the technical scope of the present invention from the description of claims.

REFERENCE NUMERALS

10 Linear guide (motion guide device), 11 Track rail (track member), 11*a* Rolling element rolling face (track face), 11*b* Bolt hole, 12 Ball (rolling element), 13 Movable block (movable member), 13*a* Load rolling element rolling face (track face), 15 End seal (seal member), 17 Lid member, 22 Load rolling element rolling path, 23 Rolling element return passage, 25 Turnabout passage, 25*a* Outer peripheral side passage face, 25*b* Inner peripheral side passage face, 26 Connection plate, 27 bolt, 30, 130 Clamper mechanism for motion guide device, 31 Clamper block, 31*a* Tapered face, 32 Clamper ball (clamper rolling element), 33, 133 Clamper ball holder (clamper rolling element holder), 33*a*, 133*a* Clamper ball holding part (clamper rolling element holding part; through-hole, notch-shaped part), 34 Coil spring (elastic member), 35 Connection bolt (fixedly holding means), 36 Operation wire.

The invention claimed is:

1. A motion guide device comprising: a clamper mechanism, a track member formed to extend in a longitudinal direction, and a movable member attached to the track member with an interposition of a plurality of rolling elements, the movable member being attached to the motion guide device relatively movable in a reciprocating manner in the longitudinal direction of the track member, the movable member being restrained/non-restrained at any position in the longitudinal direction of the track member to position the movable member with respect to the track member, the clamper mechanism comprising:
   a clamper block having a pair of left and right tapered faces opposite to left and right side faces of the track member;
   one or more clamper rolling elements arranged between each of the pair of left and right tapered faces included in the clamper block and the left and right side faces of the track member; and
   a clamper rolling element holder having a clamper rolling element holding part that holds the clamper rolling elements and is attached to the clamper block with an interposition of an elastic member that exerts an elastic force, wherein
   when the elastic force exerted by the elastic member acts in a direction in which the clamper block and the clamper rolling element holder are separated from each other, the clamper rolling elements bite the tapered faces to bring the clamper block into a state restrained to the track member, and
   when an external force against the elastic force exerted by the elastic member acts to bring the clamper block and the clamper rolling element holder closer to each other, the clamper rolling elements are brought into a state freely rollable within the tapered faces to bring the clamper block into a state not restrained to the track member.

2. The clamper mechanism for a motion guide device according to claim 1, wherein
   the clamper rolling element holder and another clamper rolling element holder are installed on the clamper block so as to sandwich the clamper block, and
   the tapered faces are formed such that a face depth becomes shallower toward sides where the clamper rolling element holders are installed, and the face depth becomes a maximum depth at central parts of the tapered faces.

3. The clamper mechanism for a motion guide device according to claim 1, wherein
   the tapered faces are formed such that a face depth becomes shallower toward a side where the clamper rolling element holder is installed.

4. The clamper mechanism for a motion guide device according to claim 1, wherein positions at which the one or more clamper rolling elements are arranged and a position at which the elastic member is arranged are configured to be at a substantially identical height position when the track member is viewed from a side face.

5. The clamper mechanism for a motion guide device according to claim 1, wherein
   the clamper rolling element holding part included in the clamper rolling element holder is arranged at a position sandwiched between one of the side faces of the track member and a corresponding one of the tapered faces included in the clamper block, and
   the clamper rolling element holding part is formed as a through-hole for holding the clamper rolling elements, and the through-hole is formed in a substantially bicircular shape.

6. The clamper mechanism for a motion guide device according to claim 1, wherein the tapered faces have a sectional shape formed by a circular arc groove.

7. The clamper mechanism for a motion guide device according to claim 1, comprising:
   fixedly holding means configured to hold the clamper block and the clamper rolling element holder in a state brought closer to each other or to enable a state in which the clamper block is not restrained to the track member.

8. The clamper mechanism for a motion guide device according to claim 1, wherein the clamper rolling elements have a diameter larger than a diameter of the plurality of rolling elements included in the motion guide device.

* * * * *